(12) United States Patent
Fedorov et al.

(10) Patent No.: US 8,606,611 B1
(45) Date of Patent: Dec. 10, 2013

(54) SCHEDULING VIA MULTIPLE DIMENSIONS INCLUDING WORKER, TIME, AND LOCATION

(75) Inventors: Boris Fedorov, San Francisco, CA (US); Jason Reid Silver, Milpitas, CA (US); Kathleen June Buettner, San Diego, CA (US); David McLelland, Union City, CA (US); Claude Keswani, Lexington, MA (US)

(73) Assignee: Intuit Inc., Mountain View, CA (US)

( * ) Notice: Subject to any disclaimer, the term of this patent is extended or adjusted under 35 U.S.C. 154(b) by 140 days.

(21) Appl. No.: 13/272,541

(22) Filed: Oct. 13, 2011

(51) Int. Cl.
*G06Q 10/00* (2012.01)

(52) U.S. Cl.
USPC .......................... 705/7.13; 705/7.15; 705/7.16

(58) Field of Classification Search
USPC ................................................. 705/7.11–7.42
See application file for complete search history.

(56) References Cited

U.S. PATENT DOCUMENTS

| | | | | |
|---|---|---|---|---|
| 8,234,143 | B1* | 7/2012 | Brewer et al. ................ | 705/7.14 |
| 8,412,553 | B2* | 4/2013 | Fuse ............................ | 705/7.16 |
| 2005/0125273 | A1* | 6/2005 | Simons et al. .................... | 705/8 |
| 2006/0069599 | A1* | 3/2006 | Hatoun et al. ..................... | 705/8 |
| 2008/0255919 | A1* | 10/2008 | Gorder ............................. | 705/9 |
| 2010/0058196 | A1* | 3/2010 | Krishnan et al. ............... | 715/747 |
| 2010/0257015 | A1* | 10/2010 | Molander ......................... | 705/9 |
| 2012/0029962 | A1* | 2/2012 | Podgurny et al. ............ | 705/7.13 |
| 2012/0078924 | A1* | 3/2012 | Woodings et al. ............ | 707/754 |
| 2012/0259540 | A1* | 10/2012 | Kishore et al. ................. | 701/410 |

OTHER PUBLICATIONS

Corrigo.com, "Cloud Based Facilities Maintenance and Work Dispatch Solutions," http://www.corrigo.com, accessed on Oct. 27, 2011 (1 page).
Xora.com, "Solutions Overview: GPS Mobile Enterprise Applications," http://www.xora.com/ss/solutions/overview, accessed on Oct. 27, 2011 (4 pages).

\* cited by examiner

*Primary Examiner* — Gurkanwaljit Singh
*Assistant Examiner* — Sujay Koneru
(74) *Attorney, Agent, or Firm* — Osha Liang LLP

(57) ABSTRACT

A method for managing projects for a small business using a graphical user interface (GUI). The method includes receiving, at a current time, a request to schedule a new project at a location and a future time selected by a user, identifying a plurality of available workers of the small business available to work on the new project at the future time, displaying, within the GUI, a new project avatar of the new project at the location on a map and a plurality of available worker avatars corresponding to the plurality of available workers, and assigning a first available worker of the plurality of available workers to the new project.

21 Claims, 8 Drawing Sheets

SCHEDULING VIA MULTIPLE DIMENSIONS INCLUDING WORKER, TIME, AND LOCATION

BACKGROUND

Small businesses with workers out in the field serving clients have a disjointed method of scheduling service appointments. Typically, the three different types of information that are required to schedule an appointment (i.e., time, location, and worker availability) are organized separately.

In computing, a graphical user interface (GUI) is a type of user interface that can be used in computers, hand-held devices (e.g., mobile phone, portable media players, tablets, e-readers, etc.), household appliances, office equipment, etc. A GUI represents the information and actions available to a user through widgets (e.g., drop-down boxes, lists, radio buttons, sliders, buttons, etc.), as opposed to typed commands or text navigation used in text-based interfaces. The actions are usually invoked through direct manipulation of the widgets by a user.

SUMMARY OF INVENTION

In general, in one aspect, the invention relates to a method for managing projects for a small business using a graphical user interface (GUI). The method includes receiving, at a current time, a request to schedule a new project at a location and a future time selected by a user, identifying a plurality of available workers of the small business available to work on the new project at the future time, displaying, within the GUI, a new project avatar of the new project at the location on a map and a plurality of available worker avatars corresponding to the plurality of available workers, and assigning a first available worker of the plurality of available workers to the new project.

In general, in one aspect, the invention relates to a system for managing a plurality of projects of a small business. The system includes a processor and a graphical user interface (GUI) executing on the processor. The GUI includes a time selector configured to identify a future time selected by a user, a new project panel configured to create a new project at the future time and associated with a location, an available worker avatar corresponding to an available worker of the small business available to work on the new project at the future time, and a map displaying a new project avatar corresponding to the new project at the location, an existing project avatar corresponding to an existing project at the future time, and an occupied worker avatar corresponding to an occupied worker assigned to the existing project.

In general, in one aspect, the invention relates to a non-transitory computer readable medium storing instructions to manage a plurality of projects of a small business using a graphical user interface (GUI). The instructions include functionality to receive, at a current time, a request to schedule a new project at a location and a future time selected by a user, identify a plurality of available workers of the small business available to work on the new project at the future time, display, within the GUI, a new project avatar of the new project at the location on a map and a plurality of available worker avatars corresponding to the plurality of available workers, and assign a first available worker of the plurality of available workers to the new project.

Other aspects of the invention will be apparent from the following description and the appended claims.

DETAILED DESCRIPTION

Figure 1:
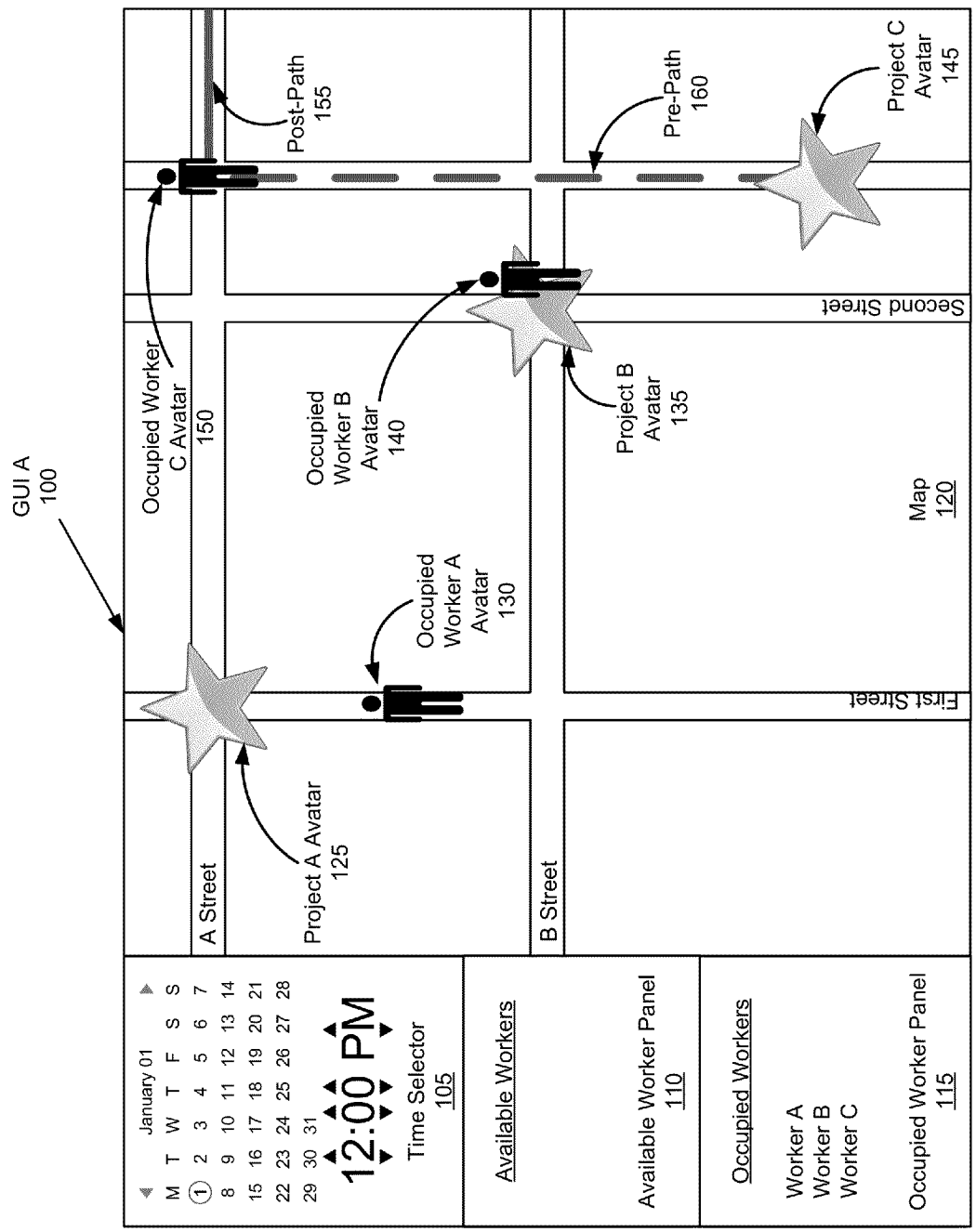
FIGS. 1-4 show system GUIs in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to manage the projects of a small business using a GUI. Specifically, the GUI displays/identifies the locations of scheduled (i.e., existing) projects on a map, the one or more workers assigned to the scheduled projects (i.e., occupied workers), the workers not assigned to the scheduled projects (i.e., available workers), and the locations of the occupied/available workers at a time specified by a user (e.g., small business owner). Further, the GUI may be used to schedule a new project at the time specified by the user and assign one or more available workers to the new project. Further still, the GUI may be used to check the status of scheduled projects and workers at the time specified by the user.

In one or more embodiments of the invention, a project is any event for which a small business provides one or more workers in exchange for some form of compensation. Projects are defined by at least a location (e.g., street address) and a start time (e.g., 1:00 pm on February 3). Projects may also be defined by an end time (e.g., 2:00 pm on February 3), an estimated duration (e.g., 1.5 hours), etc. Accordingly, a project may include an appointment with a doctor, a balloon delivery service, a music concert, an auto rental pickup, a clown act, a performance, a plumbing job, an airline departure, an examiner interview, a meeting with a client, a festival, a social gathering, a special sale, a television installation, etc.

In one or more embodiments of the invention, a worker is any individual or any asset associated with the small business. Accordingly, a worker may be a doctor, a clown, a plumber, a carpet-cleaning robot, a bus, an airplane, an examiner, a rock band, a stapler, a news reporter, a consultant, etc.

FIG. 1 shows GUI A (100) in accordance with one or more embodiments of the invention. As shown in FIG. 1, the GUI A (100) has multiple components including a time selector (105), an available worker panel (110), an occupied worker panel (115), and a map (120). The GUI A (100) may execute on and be displayed using any type of hardware device including a server, mainframe, desktop personal computer (PC), laptop, personal digital assistant (PDA), television, cable box, satellite box, kiosk, telephone, mobile phone, tablet, e-reader, etc.

In one or more embodiments of the invention, the time selector (105) is a GUI widget manipulated/operated by a user to select a time (e.g., 9:00 am on Mar. 4, 2020). The selected time may correspond to any moment in the future or the past. The time selection may be in 24-hour format, 12-hour format, Gregorian format, etc. As shown in FIG. 1, the time selector (105) may take the form of an interactive calendar that allows the user to randomly select a date and interactive arrows that allow the user to successively select a month, hour, and minute. In other examples, the time selector (105) may include textboxes, an adjustable time line, radio buttons, drop-down lists, checkboxes, labels, and other GUI widgets to input a time selection. Further, the time selector (105) may be configured to display a pre-determined default time and date when the GUI A (100) is initially displayed to the user.

In one or more embodiments of the invention, the available worker panel (110) is configured to display/identify workers available at the time selected using the time selector (105). The available workers may be displayed/identified in the available worker panel (110) using any number of representations including avatars, text, lists, diagrams, bar graphs, emoticons, etc. An available worker is a worker eligible to be assigned to a project at the selected time. In other words, an available worker is a worker that is not already assigned to a project at the selected time. The available worker panel (110) may display all workers in the small business that are available at the selected time or display only a portion of the workers in the small business that are available at the selected time. For example, the available worker panel (110) may only display workers that are both available at the selected time and are within the region covered by the map (120). In another example, the available worker panel (110) may only display workers that are available at the time selection and are in a certain department of the company (e.g., Human Resources, Engineering, Executives, etc.). In FIG. 1, all workers are already assigned to a project at the selected time and thus the available worker panel (110) is empty. The available worker panel (110) is updated in response to a change in the selected time.

In one or more embodiments of the invention, the occupied worker panel (115) is configured to display occupied workers at the time selected using the time selector (105). The occupied workers may be displayed/identified in the occupied worker panel (115) using any number of representations including avatars, text, lists, diagrams, bar graphs, emoticons, etc. An occupied worker is a worker that is not-eligible to be assigned to a project at the selected time. In other words, an occupied worker is a worker that is already assigned to a project at the selected time. For example, in FIG. 1, on January 1 at 12:00 PM, Worker A, Worker B, and Worker C are occupied at the selected time. Accordingly Worker A, Worker B, and Worker C are displayed/identified in a list in the occupied worker panel (115). The occupied worker panel (115) is updated in response to a change in the selected time.

In one or more embodiments of the invention, the map (120) represents a geographic region of any scale including buildings, streets, cities, counties, states, countries, etc. The map (120) may be a map of the area surrounding a scheduled project or the area surrounding a potential project. The map (120) may include a real-time image (e.g., video image) of streets, cities, counties, etc. The map (120) may be a bird-eye view of streets, cities, counties, etc. The map (120) may include photographs of landmarks. The map (120) may include elevation and rivers, trails, traffic, and mountains.

In one or more embodiments of the invention, the map (120) includes one or more worker avatars (e.g., Occupied Worker A Avatar (130), Occupied Worker B Avatar (140), Occupied Worker C Avatar (150)) and one or more project avatars (e.g., Project A Avatar (125), Project B Avatar (135), and Project C Avatar (145)). The worker avatars (130, 140, 150) are visual representations of workers and the project avatars (125, 135, 145) are visual representations of projects. Visual representations may be of any shape, of any color, of any size, and static or animated. For example, in FIG. 1, the worker avatars (130, 140, 150) are human shaped and the project avatars (125, 135, 145) are star shaped. In one or more embodiments of the invention, the map (120) is updated/refreshed in response to a change in the selected time.

In FIG. 1, Occupied Worker A Avatar (130) represents Worker A, Occupied Worker B Avatar (135) represents Worker B, Occupied Worker C Avatar (150) represents Worker C, Project A Avatar (125) represents Project A, Project B Avatar (135) represents Project B, and Project C Avatar (145) represents Project C. Further, the project avatars (125, 135, 145) are displayed within the map (120) at the locations of their respective projects. For example, since Project A is taking place at the cross streets of A Street and First Street, Project A Avatar (125) is displayed on the map (120) at the cross streets of A Street and First Street.

Similarly, worker avatars (130, 140, 150) may also be displayed at the locations of their corresponding workers. In FIG. 1, Occupied Worker B is scheduled with Project B at 12:00 PM on January 1. Accordingly, the Occupied Worker B Avatar (140) is displayed on top of the Project B Avatar (135). A worker may be scheduled with a project beginning after the selected time. Thus, at the selected time, the worker is in transit to the location of the project. For example, in FIG. 1, assume Occupied Worker A is scheduled with Project A at 12:10 PM on January 1. Accordingly, on the map (120), the Occupied Worker A Avatar (130) is depicted near the Project A Avatar (125) (e.g., en route to the location of Project A) when the selected time is 12:00 PM on January 1.

In one or more embodiments of the invention, the map (120) includes a Pre-Path (160) and a Post-Path (155) reflecting travelling status, at the time selection. A path is a line that shows the historic and/or scheduled trajectory/movement/route of a worker. A Pre-Path (160) is a line on the map (120) that shows the historic trajectory of the worker prior to the selected time. Accordingly, the pre-path (160) ends at the Occupied Worker C Avatar (150). A Post-Path (155) is a line on the map (120) that shows the scheduled trajectory of the worker following the selected time. Accordingly, the post-path (155) starts at the Occupied Worker C Avatar (150).

In one or more embodiments of the invention, a post-path and/or a pre-path of a worker intersects a project avatar on the map (120) to denote the worker was assigned to or is assigned to the corresponding project. As shown in FIG. 1, the pre-path (160) intersects Project C Avatar (145). This denotes Worker C was assigned to Project C, which concluded before the selected time.

Figure 2:
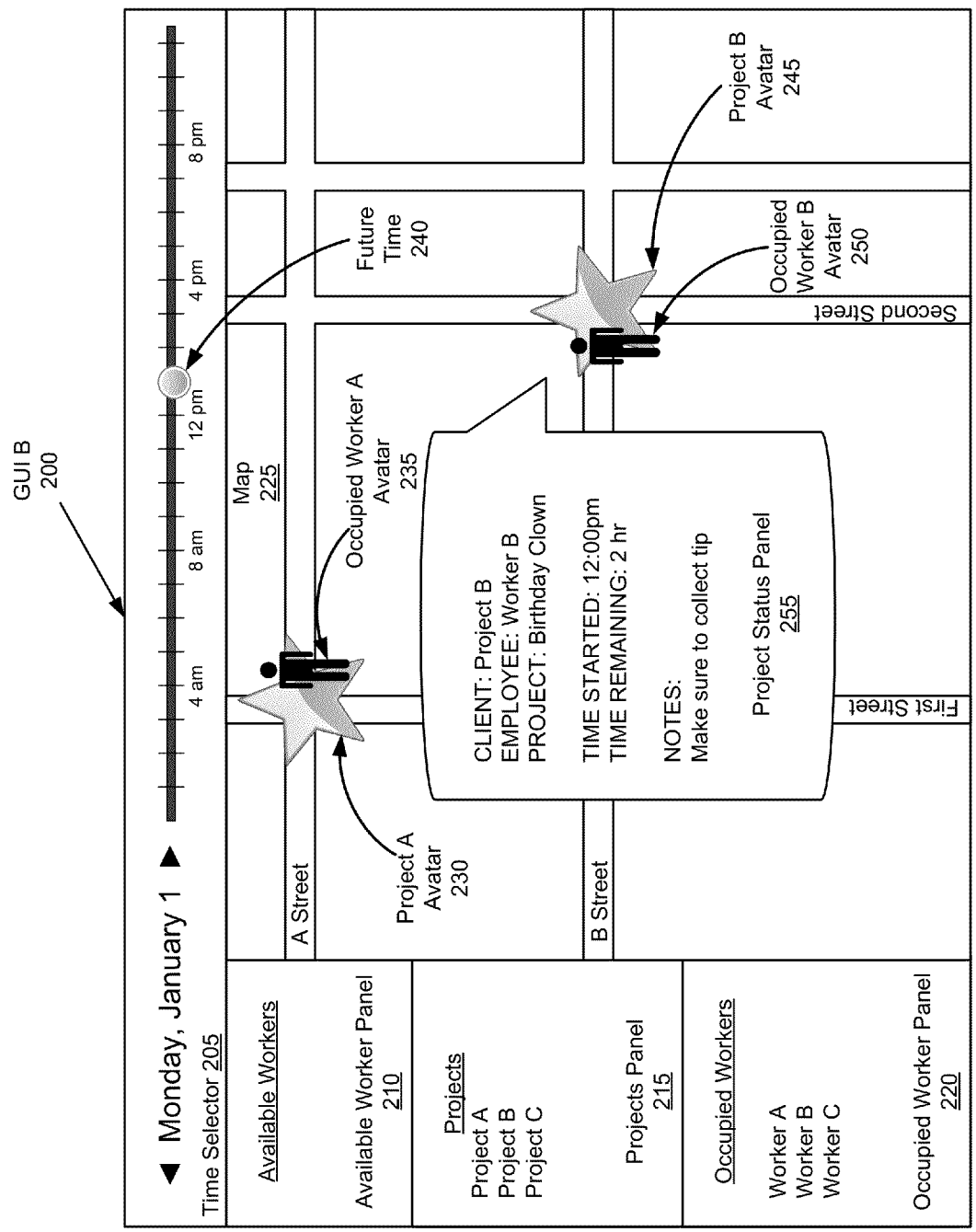

FIG. 2 shows GUI B (200) in accordance with one or more embodiments of the invention. As shown in FIG. 2, the GUI B (200) has multiple GUI components such as a time selector (205), an available worker panel (210), a projects panel (215), an occupied worker panel (220), and a map (225). The GUI B (200) may execute on and be displayed using any type of hardware device including a server, mainframe, desktop personal computer (PC), laptop, personal digital assistant (PDA), television, cable box, satellite box, kiosk, telephone, mobile phone, tablet, e-reader, etc.

In one or more embodiments of the invention, the time selector (205) is a GUI widget manipulated/operated by a user to select a time (e.g., 1:00 pm on January 1). The selected time may correspond to any moment in the future or the past. The time selection may be in 24-hour format, 12-hour format, Gregorian format, etc. As shown in FIG. 2, the time selector (205) may correspond to a timeline for the user to selected a time. As shown in FIG. 2, the time selector (205) may take the form of a timeline and the user can select a point on the timeline corresponding to the desired time.

In one or more embodiments of the invention, the available worker panel (210) is a panel in the GUI B (200) and is configured to display workers available at the time selected using the time selector (205). The available worker panel (210) may display all workers in the company that are available at the time selection or display a portion of the workers in the company that are available at the time selection. As shown in FIG. 2, the available worker panel (210) is a box with a list displaying the names of the workers available at the time selection. There are no workers available at 1:00 PM on January 1 so the available worker panel (210) is empty.

In one or more embodiments of the invention, the projects panel (215) is a panel in the GUI B (200) and is configured to display projects scheduled to start at the selected time and/or projects that are being executed at the selected time. As shown in FIG. 2, the projects panel (215) is a box with a list displaying the projects scheduled to occur/occurring at the selected time. For example, in FIG. 2, on January 1 at 1:00 PM, Project A, Project B, and Project C are either scheduled to start and/or are already in the process of being executed. Thus, Project A, Project B, and Project C are listed in the projects panel (215).

In one or more embodiments of the invention, the occupied worker panel (220) is a panel in the GUI B (200) and is configured to display workers occupied at the time selection specified using the time selector (205). As shown in FIG. 2, the occupied worker panel (220) is a box with a list displaying the names of workers occupied at the selected time. Because Worker A, Worker B, and Worker C are occupied at the selected time (with Project A, Project B, and Project C respectively), Worker A, Worker B, and Worker C are displayed in a list in the occupied worker panel (220) reflecting their status at the selected time.

As shown in FIG. 2, the map (225) depicts the geographic area surrounding the location of Project B (e.g., the cross streets of B Street and Second Street). The map (225) also includes worker avatars and project avatars. In FIG. 2, Occupied Worker A Avatar (235) and Occupied Worker B Avatar (250) are worker avatars and Project A Avatar (230) and Project B Avatar (245) are project avatars. Occupied Worker A Avatar (235) represents Worker A, Occupied Worker B Avatar (250) represents Worker B, Project A Avatar (230) represents Project A, and Project B Avatar (245) represents Project B. Further, each project avatar and worker avatar are displayed at their respective locations. Project B is scheduled to occur at the cross streets of B Street and Second Street. Thus, in FIG. 2 on the map (225), the Project B avatar (245) is displayed at the cross street of B Street and Second Street. Similarly, Worker B is assigned to Project B occurring at 1:00 PM on January 1 and thus Occupied Worker B Avatar (250) is also displayed at the cross street of B Street and Second Street.

In one or more embodiments of the invention, the GUI B (200) includes a Project Status Panel (255) for displaying detailed information regarding a project. Detailed information may include client name, the company of a client, the scheduled address, the scheduled start time, the scheduled end time, the scheduled time allotted, the difference between the selected time and the scheduled end time, the difference between the time selection and the scheduled start time, the project status, notes regarding the project, a picture of the client, links to other documents/files associated with the project, the name of the assigned worker, the picture of the assigned worker, project type, client feedback, etc. The project status may be any visual representation of the status of the project including, for example, an emoticon indicating the satisfaction of the client, an adjustable bar indicating the amount of the project completed, an hourglass indicating the project is occurring at the scheduled time, an exclamation mark indicating an emergency occurring regarding the project, etc. As shown in FIG. 2, the project status panel (255) displays detailed information in a box with text including the name of the client (e.g., Project B), the name of the assigned worker (e.g., Worker B), the project type (e.g., Birthday Clown), the scheduled start time (e.g., 12:00 PM), the difference between the selected time and the scheduled end time (e.g., 2 hours), and notes regarding the project (e.g., Make sure to collect tip). In one or more embodiments, the project status panel (255) is displayed in response to user activation, such as a key click on or a mouser over the project avatar (245). For example, the project status panel (255) may continue to be displayed until it is turned off by the user. In another example, the project status panel (255) will be turned off automatically after displayed for a pre-determined time duration. While displayed, if the time selection is changed to a different time and date by the user using the time selector (205), the project status panel (255) may be updated based on this different time selection.

Figure 3A:
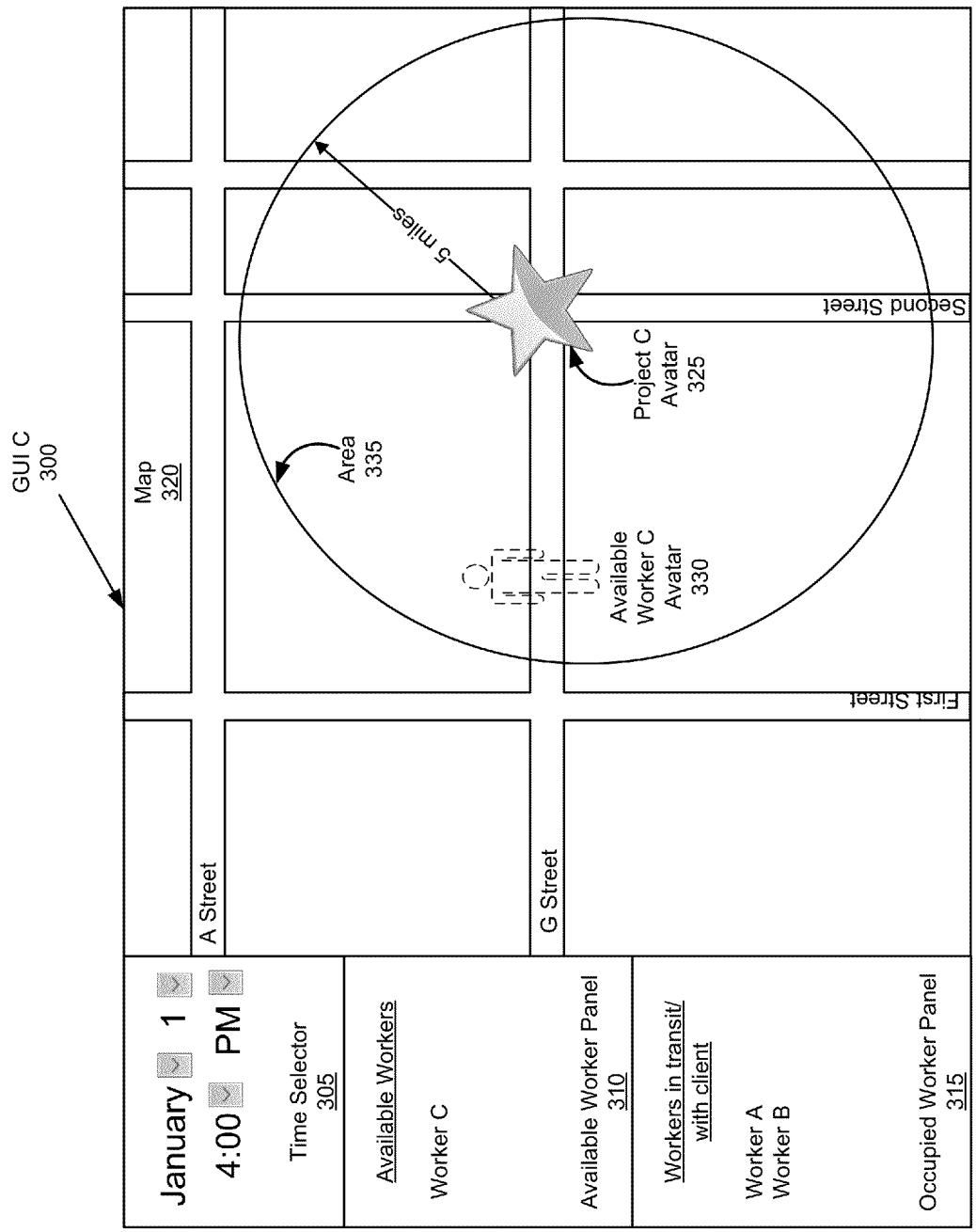

FIG. 3A shows GUI C (300) in accordance with one or more embodiments of the invention. As shown in FIG. 3A, the GUI C (300) has multiple GUI components such as a time selector (305), an available worker panel (310), an occupied worker panel (315), and a map (320). The GUI C (300) may execute on and be displayed using any type of hardware device including a server, mainframe, desktop personal computer (PC), laptop, personal digital assistant (PDA), television, cable box, satellite box, kiosk, telephone, mobile phone, tablet, e-reader, etc.

In one or more embodiments of the invention, the time selector (305) is a GUI widget manipulated/operated by a user to select a time. As shown in FIG. 3A, the time selector (305) includes components that allow the user to input a time selection (e.g., January 1, 4:00 PM) including drop-down lists that allow a user to select a date and time.

In one or more embodiments of the invention, the available worker panel (310) is configured to display workers available at the time selected using the time selector (305). The available worker panel (310) may display all workers in the company that are available at the time selection or display a portion of the workers in the company that are available at the time selection. As shown in FIG. 3A, the available worker panel (310) is a box with a list displaying the names of the workers available at the selected time. Worker C is not occupied at the selected time (e.g., January 1, 4:00 PM). Accordingly, as shown in FIG. 3A, Worker C is listed in the available worker panel (310).

In one or more embodiments of the invention, the occupied worker panel (315) is configured to display workers who are in transit to a project at the selected time, workers who are working on a project at the selected time, and/or workers who completed a project (and thus are essentially unavailable) just prior to the selected time. As shown in FIG. 3A, the occupied worker panel (315) is a box with a list displaying the names of occupied workers at the selected time (e.g., January 1, 4:00 PM). Because Worker A and Worker B are either in transit or with a client at the time selection, Worker A, and Worker B are displayed in a list in the occupied worker panel (315).

In one or more embodiments of the invention, the map (320) depicts the geographic area surrounding the location of Project C (e.g., the cross streets of G Street and Second Street). The map (320) also includes a project avatar (i.e., Project C Avatar (325)). Project C is scheduled to occur at the cross streets of G Street and Second Street. Thus, in FIG. 3A on the map (320), the project C avatar (325) is displayed at the cross street of G Street and Second Street.

In one or more embodiments of the invention, following the creation and/or selection of a project (or the project's avatar), the map (320) highlights an area surrounding the location of the created/selected project. For example, as shown in FIG. 3A, following the creation and/or selection of Project C, the map (320) highlights the area (335) surrounding the location of Project C, denoted by Project C Avatar (325). The area (335) may be of any shape including a circle of a predetermined radius (e.g., 5 miles). The area (335) may be shaded a different color than the remaining portions of the map (320). The area (335) may be displayed with a blinking perimeter. Those skilled in the art, having the benefit of this detailed description, will appreciate that area (335) may be differentiated from the remaining portions of the map (320) using various shading, coloring, animation techniques.

In one or more embodiments of the invention, following the creation and/or selection of a project, the map (320) highlights/displays available worker avatars within the area (335). In FIG. 3A, assume Worker C is scheduled to complete a project on G Street on January 1 by 3:30 PM. Also, assume Worker C is not scheduled to work on another project on January 1 at 4:00 PM. Because Worker C's project on G Street is located within the area (335) and finishes before 4:00 PM, the available worker C avatar (330) corresponding to Worker C is highlighted in response to the creation and/or selection of Project C Avatar (325). As shown in FIG. 3A, one option for highlighting the available worker C avatar (330) includes the use of broken lines on the perimeter of the avatar.

Figure 3B:
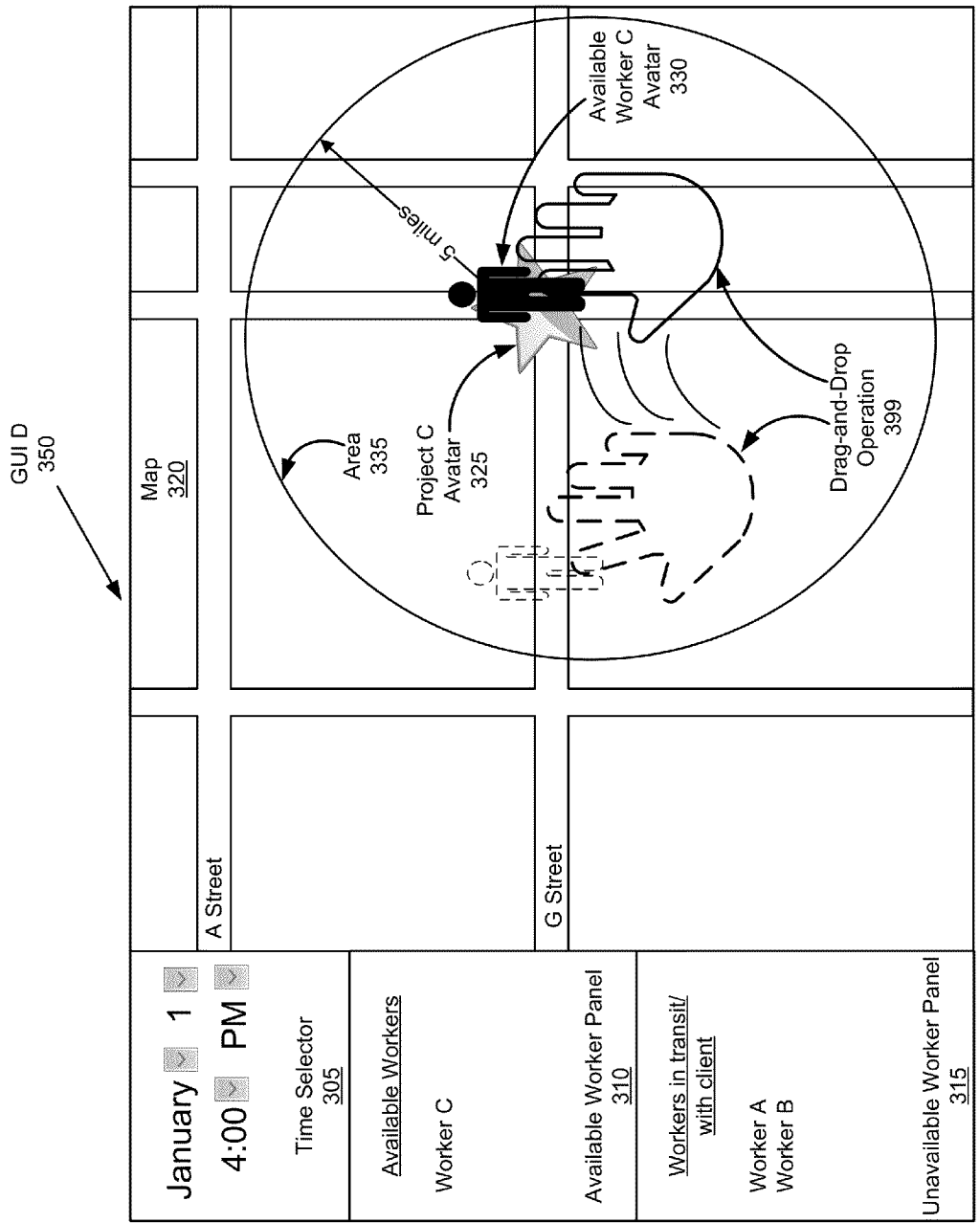

FIG. 3B shows GUI D (350) in accordance with one or more embodiments of the invention. In particular, the GUI D (350) is essentially the same as the GUI C (300), described above in reference of FIG. 3A, with the exception of a drag-and-drop operation (399). The drag-and-drop operation is one method of assigning a worker to a project. The drag-and-drop operation involves dragging an available worker avatar and dropping the available worker avatar on a project avatar to assign the corresponding worker to the corresponding project. For example, in FIG. 3B, the drag-and-drop operation (399) involves dragging available worker C avatar (330) and dropping available worker C avatar (330) onto the project C avatar (325). This effectively assigns/schedules worker C to project C. The drag-and-drop operation (399) may be completed using a mouse by pressing and holding a button on the mouse while moving the mouse and dragging the cursor. In another example, a drag-and-drop operation may be completed by using a human finger to touch a touch screen and maintain contact with the touch screen while moving the finger.

Figure 4:
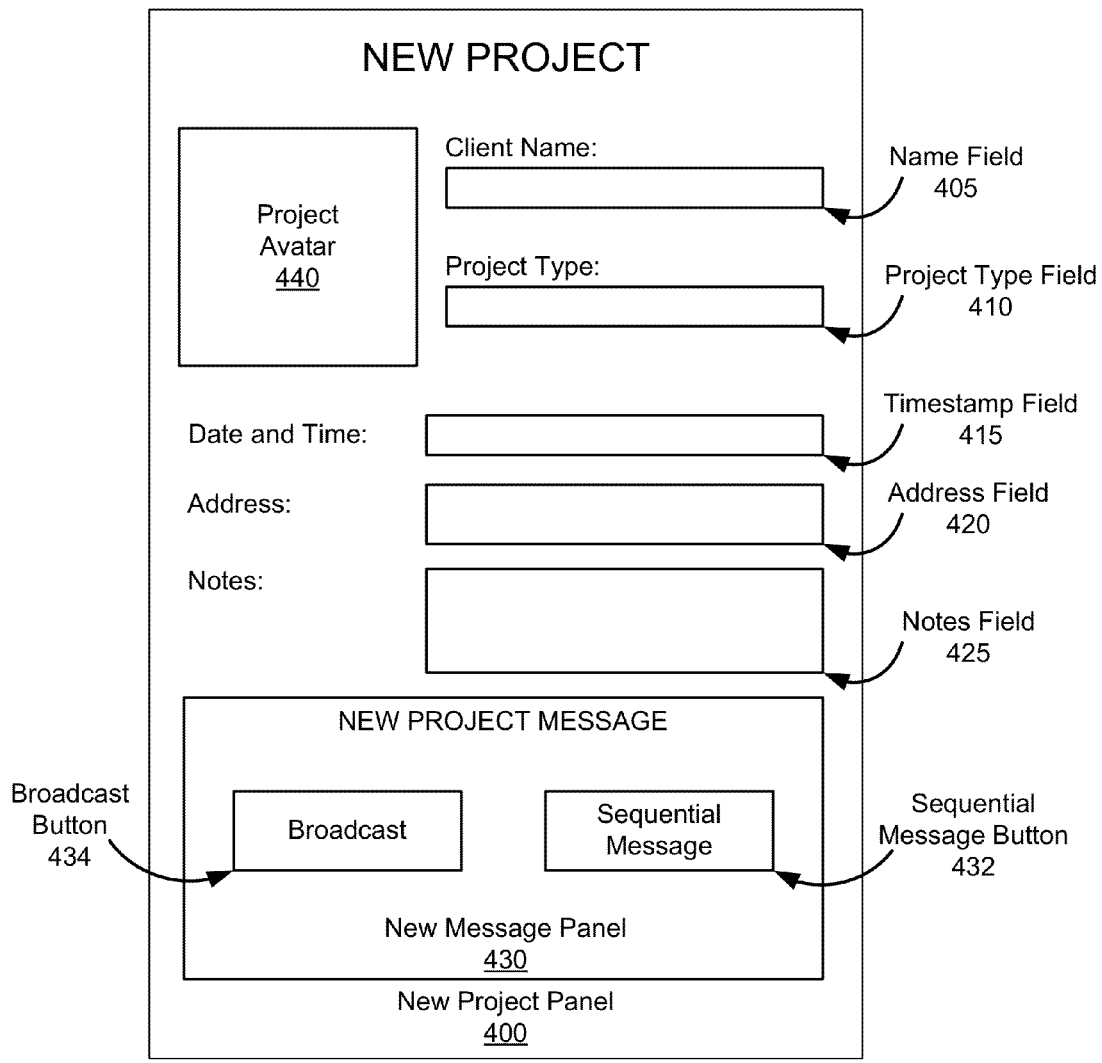

In addition to various GUI components described in reference to FIGS. 1-3B above, FIG. 4 shows a new project panel (400) in accordance with one or more embodiments of the invention. As shown in FIG. 4, the new project panel (400) includes multiple GUI components such as a name field (405), a project type field (410), a timestamp field (415), an address field (420), a notes field (425), a new message panel (430), a broadcast button (434), a sequential message button (432), and a project avatar (440).

In one or more embodiments of the invention, the new project panel (400) allows a user to create/register a new project. In other words, the new project panel (400) is generated/displayed in response to a request to create a new project. The new project panel (400) includes multiple fields to be populated with data from the user defining the new project.

A field is a GUI component that allows a user to input data items (e.g., characters, strings, images, video clips, audio clips, numbers, etc.). In one or more embodiments of the invention, the name field (405) allows the user to input a name of the new project; the name of the client corresponding to the new project; the client contact for the project; and/or the name of a representative of a client associated with the new project, etc.

In one or more embodiments of the invention, the new project panel (400) includes a project type field (410) allowing the user to input a project type. The project type may be an activity involved with the new project. Examples of activities involved with a project include an appointment with the doctor, a balloon delivery service, a music concert, an auto rental pickup, a clown act, a performance, a plumbing job, an airline departure, an examiner interview, a meeting with a client, a festival, a social gathering, a special sale, a television installation, etc. The project type may also be a department related to the new project. Examples of departments related to the project include engineering, human resources, client managing, information technology, administrative, executives, etc. The project type may also be an industry related to the new project. Examples of industries related to the new project include charity, veterinarian, medical, entertainment, etc.

In one or more embodiments of the invention, the new project panel (400) includes a time stamp field (415) allowing the user to input a start time for the project, an end time for the project, and/or an estimated duration of the project, etc. Like the time selection, the start/end time includes a date and a time. Accordingly, the scheduled time may be any time and date in the future or the past. The time selection may be in 24-hour format, 12-hour format, Gregorian format, etc.

In one or more embodiments of the invention, the new project panel (400) includes an address field (420) allowing the user to input an address associated with the new project. The address may include a street address, a city, a county, a state or province, a country, etc. The address associated with the new project may be, for example, an address of a client associated with the new project, an address of a venue associated with the new project, and/or an address of the location of the new project, etc.

In one or more embodiments of the invention, the new project panel (400) includes a notes field (425) allowing the user to input any notes associated with the new project. The notes may be in various formats including text, images, video clips, audio clips, etc. Examples of notes include reminders for the assigned worker, tips on handling a client, warnings about construction near the location of the new project, advice for completing the project, information about a client's family, etc.

In one or more embodiments of the invention, the new project panel (400) displays a project avatar (440) selected by the user for the new project. The project avatar (440) may be selected from an existing list of avatars and/or the project avatar may uploaded by the user. Examples of the project avatar (440) include a photograph of a client, a logo of a client, and/or a photograph of the location of the new project, etc.

In one or more embodiments of the invention, the new project panel (400) includes a new message panel (430) allowing the user to send a notification of the new project to workers. Workers may be notified of the new project by various means including, for example, an email, a voicemail, a text, a fax, a phone call, a telegram, etc. Upon receiving the notification, workers may choose to accept being assigned to the new project or reject being assigned to the new project.

In one or more embodiments of the invention, the new message panel includes a broadcast button (434) and a sequential message button (432). The new project maybe assigned to the worker from whom the first accept project message is received. Alternatively, if multiple accept project messages are received, the new project is assigned to one of the workers responding with the accept project message at random. When the broadcast button (434) is selected, a new project message is broadcast to all available workers. When the sequential message button (432) is selected, a new project message is sent to each worker (e.g., available worker) accordingly to the worker's rank. For example, the new project message is sent to the highest ranked worker first. If a decline project message is received from the highest ranked worker, then new project message is then sent to the second highest ranked worker. If a decline project message is received from the second highest ranked worker, the new project message is then sent to the third highest ranked worker, etc. The sequence continues until an accept project message is received from a worker. The new project is assigned to the worker from whom the accept project message is received.

Figure 5:
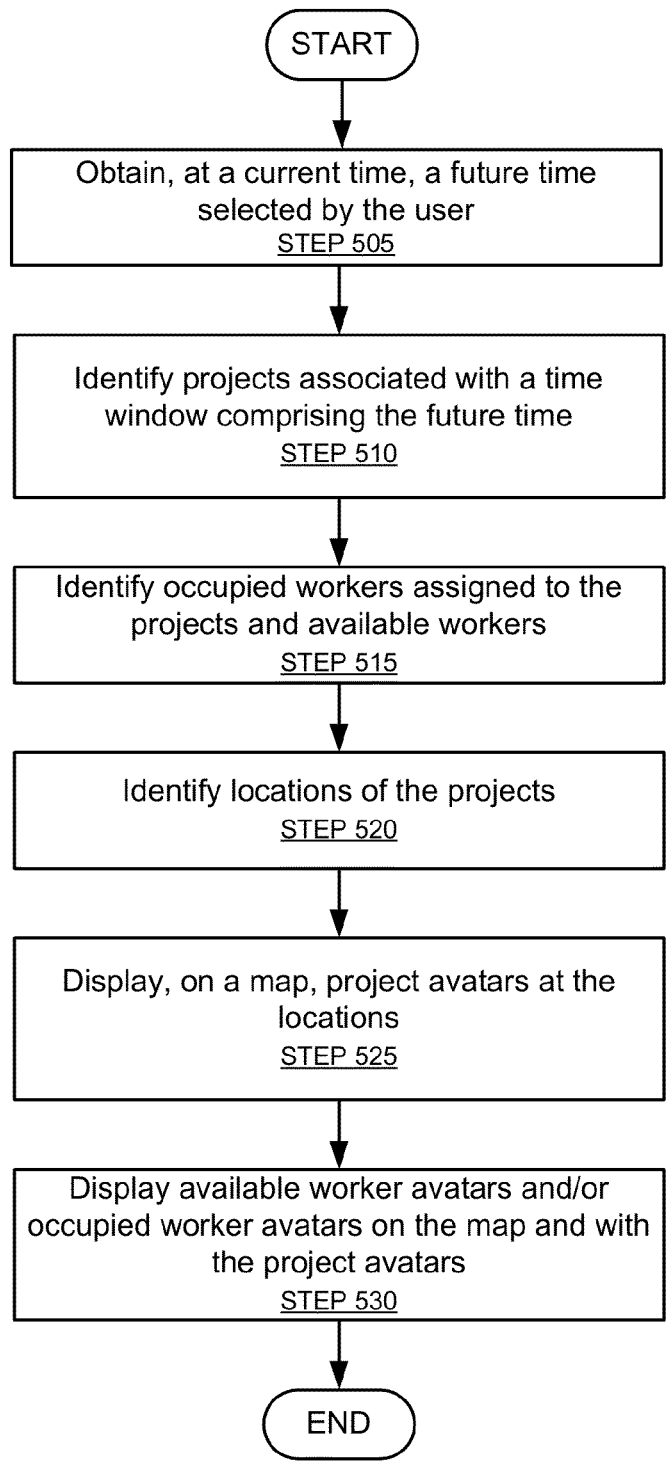
FIGS. 5 and 6 show flowcharts in accordance with one or more embodiments of the invention.

FIG. 5 shows a flowchart in accordance with one or more embodiments of the invention. The process shown in FIG. 5 may be used, for example, to manage projects of a small business. Those skilled in the art, having the benefit of this detailed description, will appreciate the sequence of steps shown in FIG. 5 may differ among embodiments of the invention, and that one or more of the steps may be optional. In one or more embodiments of the invention, the method depicted in FIG. 5 may be used with one or more of the GUIs described in reference to FIGS. 1-4 above.

Initially, in STEP 505, a future time is selected by a user. The selected time may include both a date and a time. Moreover, the user may select the future time using a time selector (e.g., time selectors (105, 205, 305)).

In STEP 510, a time window including the selected future time is calculated and existing projects associated with the time window are identified. Specifically, the time window is a block of time starting before the selected future time and ending after the selected future time. For example, the time window may start 15 minutes prior to the selected time and end 20 minutes after the selected time. The projects associated with the time window include projects that start within the time window, projects that end within the time window, and/or projects that are being executed during at least a portion if not all of the time window.

In STEP 515, the occupied workers assigned to the projects are identified. Also, the available workers (e.g., workers who are not assigned to any project associated with the time window) are identified. In STEP 520, the locations of the projects are identified. The locations of the projects may correspond to the street addresses (e.g., the street address recorded by the new project panel (400)) of the projects.

In STEP 525, project avatars corresponding to the projects are displayed on a map. Each project avatar may be positioned on the map according to the corresponding project's location (e.g., street address). As discussed above, project avatars are visual representations of projects. Further, project avatars may be of any shape including stars, circles, animals, airplanes, trucks, etc.

Finally, in STEP 530, available worker avatars representing the available workers identified in STEP 515, and occupied worker avatars representing the occupied workers also identified in STEP 515, are displayed on the map. Specifically, the position of each occupied worker avatar on the map is based on the location of the occupied worker's corresponding project. For example, an occupied worker avatar may be placed on top of or adjacent to the project avatar representing the project to which the occupied worker is assigned. Moreover, the position of each available worker avatar on the map may be based on the location of the available worker's previous project. As discussed above, worker avatars may be of any shape including stars, circles, animals, humans, airplanes, photographs, etc.

In one or more embodiments of the invention, in addition to or as an alternative to displaying available worker avatars representing available workers in STEP 530, the available workers are displayed in a list in a panel, such as the available worker panel (110), (210), or (310), described above in reference to FIGS. 1-3B. Similarly, the occupied workers identified in STEP 515 may alternatively be listed in a panel, such as the occupied worker panel (115), (220), or (315), described above in reference to FIGS. 1-3B.

Figure 6:
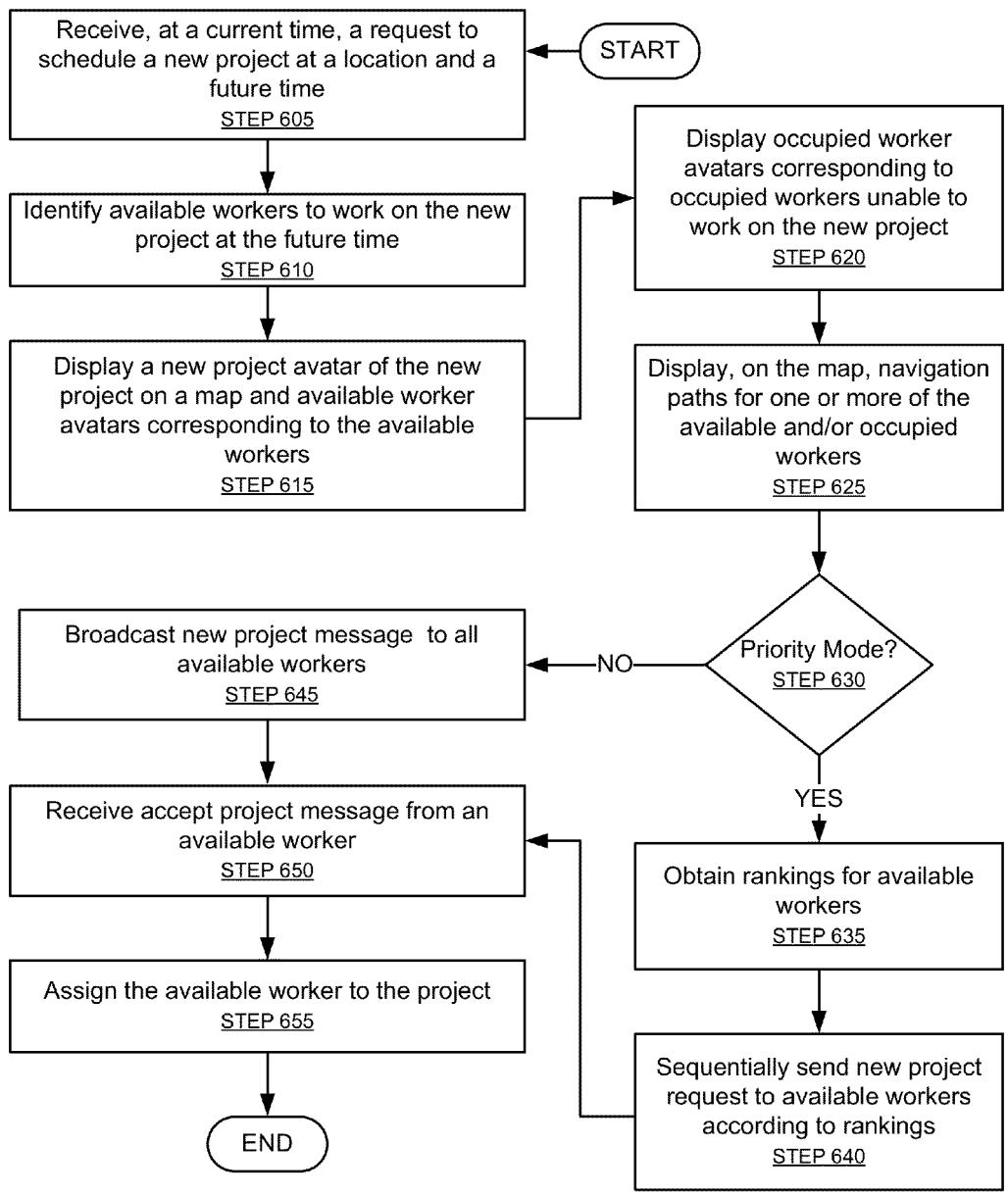

FIG. 6 shows a flowchart in accordance with one or more embodiments of the invention. The process shown in FIG. 6 may be used, for example, to create a new project. Those skilled in the art, having the benefit of this detailed description, will appreciate the sequence of steps shown in FIG. 6 may differ among embodiments of the invention, and that one or more of the steps may be optional or repeated. In one or more embodiments of the invention, the method depicted in FIG. 6 may be used with one or more of the GUIs described in reference to FIGS. 1-4 above.

Initially, the user wishes to create a new project. In STEP 605, a request to schedule a new project is received. The request includes a location of the project and a start time of the project will take place. In one or more embodiments of the invention, the project request also includes a name of a client, a project type, an estimated duration of the project, etc.

In STEP 610, workers available to be assigned to the new project are identified. In one or more embodiments of the invention, workers that are available to be assigned are workers that are not yet assigned to another project at the selected future time. Further, available workers may also include workers that are scheduled to complete another project within a predetermined time frame (e.g., 20 mins) before the selected time and within a predetermined distance (e.g., 7 miles) of the location of the new project.

In STEP 615, a map is displayed to the user. The map may include a project avatar representing the new project displayed on the map at the project's location. The map may also include worker avatars representing the location(s) of available workers. In one or more embodiments of the invention, worker avatars representing the available workers are displayed at the locations of projects scheduled to be completed prior to the selected time.

In STEP 620, worker avatars representing occupied workers are displayed on the map. Occupied workers include workers assigned to projects that will be executed during the selected time and workers that are assigned to projects scheduled to start within a predetermined time range (e.g., 10 mins) after the selected time. Worker avatars representing occupied workers are displayed at the locations of the scheduled projects In one or more embodiments of the invention, worker avatars representing occupied workers are displayed in a panel, such as the occupied workers panel (115), (220), or (315) described in reference to FIGS. 1-3B above.

In STEP 625, the navigation paths (e.g., post-path (155) and pre-path (160) described in reference to FIG. 1 above) are displayed for one or more of the occupied workers and/or available workers on the map. A path is a line that shows the historic and/or scheduled trajectory/movement/route of a worker. A pre-path is a line on the map showing the historic trajectory of the worker prior to the selected time. A post-path is a line on the map that shows the scheduled trajectory of the worker following the selected time. In one or more embodiments, navigation paths are displayed for an occupied worker when the user selects a worker avatar representing the occupied worker. Also, the pre-path and the post-path may be distinguished by different colors or patterns.

In STEP 630, it is determined whether priority mode is invoked. Priority mode is a feature that may be invoked by a user. When it is determined that priority mode is invoked, the process proceeds to STEP 635. When it is determined that priority mode has not been invoked, the process proceeds to STEP 645.

If priority mode is not invoked/activated, a notification of the new project is sent to all identified available workers at once (STEP 645). Specifically, a new project message is broadcasted to all available workers. The new project message may include/identify the start time, project location, project type, and client associated with the project. As stated above, the notification may be by way of mobile text, email, phone call, telegram, etc.

Upon receiving the new project messages, one or more available workers may response with an accept project message. Accordingly, one or more accept project messages may be received in response to the new project message (STEP 650). In one or more embodiments of the invention, the available worker corresponding to the first received project message is assigned to the new project (STEP 655). In one or more embodiments of the invention, one of the multiple accept project messages is selected at random, and the corresponding available worker is assigned to the new project (STEP 655).

If priority mode is activated/invoked, then the rankings for the available worker are obtained (STEP 635). In STEP 640, a new project message is sent to each worker (e.g., available worker) accordingly to the worker's rank. For example, the new project message is sent to the highest ranked worker first. If a decline project message is received from the highest ranked worker, then new project message is then sent to the second highest ranked worker. If a decline project message is received from the second highest ranked worker, the new project message is then sent to the third highest ranked worker, etc. The sequence continues until an accept project message is received from a worker (STEP 650). The new project is assigned to the worker from whom the accept project message is received (STEP 655).

Figure 7:
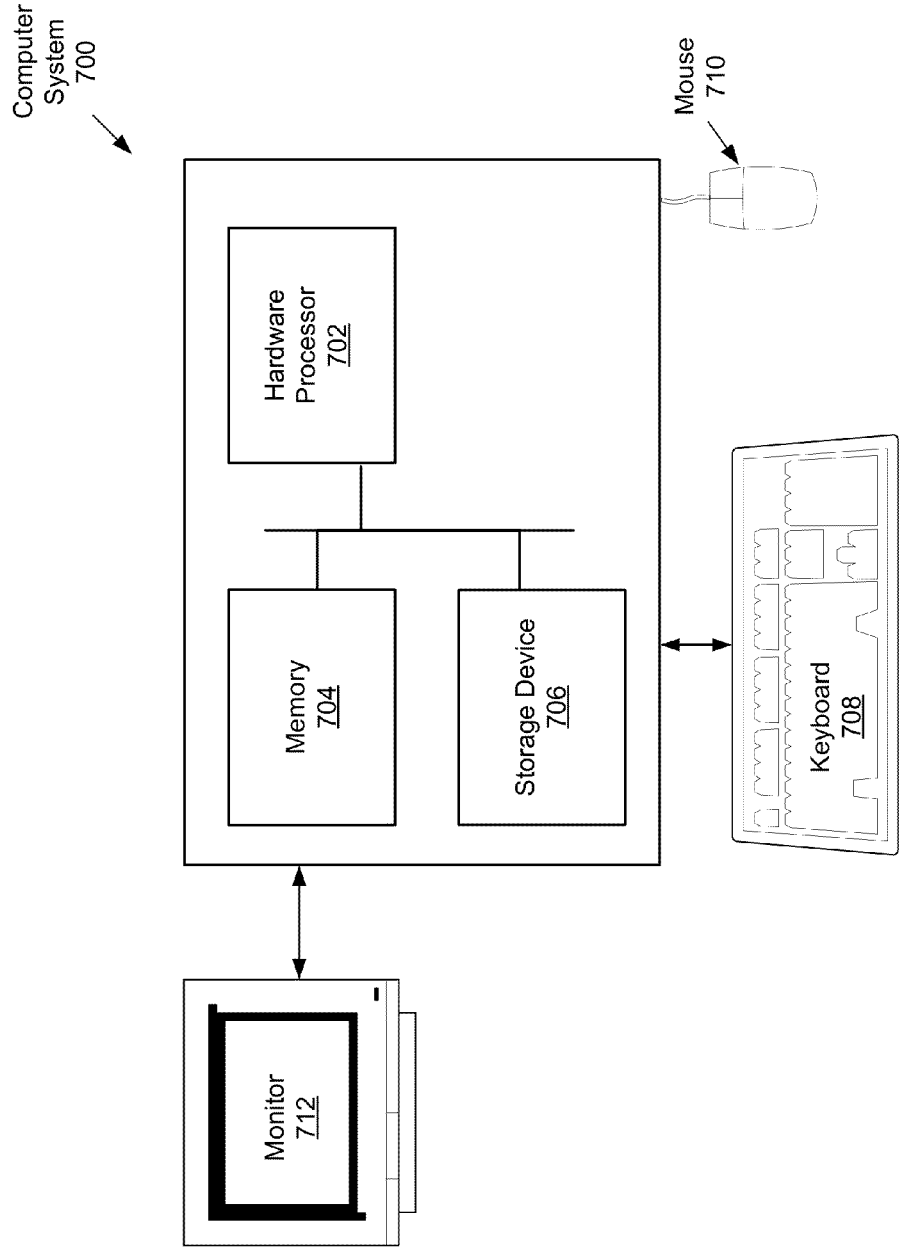
FIG. 7 shows a computer system in accordance with one or more embodiments of the invention.

The invention may be implemented on virtually any type of computer regardless of the platform being used. For example, as shown in FIG. 7, a computer system (700) includes a memory (704), a storage device (706), a hardware processor (702) and numerous other elements and functionalities typical of today's computers (not shown). The computer (700) may also include input means, such as a keyboard (708) and a mouse (710), and output means, such as a monitor (712). The computer system (700) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, the invention may be implemented on a distributed system having a plurality of nodes, where each portion of the invention (e.g., one or more GUI components shown in FIGS. 1-4) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing projects for a small business using a graphical user interface (GUI), comprising:
   receiving, at a current time and using a time selector displayed in a single GUI window, a first user selection from a user to select a first future time;
   receiving, at a current time, a request to schedule a new project at a location and the first future time selected by the user;
   identifying a plurality of available workers of the small business available to work on the new project at the first future time;
   displaying, within the single GUI window, a new project avatar of the new project at the location on a map and a plurality of available worker avatars corresponding to the plurality of available workers;
   assigning a ranking to the plurality of available workers comprising a first available worker and a second available worker;
   sending, before assigning the first available worker, a new project message to the second available worker having a first rank;
   receiving a decline project message from the second available worker;
   sending, in response to receiving the decline project message, the new project message to the first available worker having a second rank, wherein the first rank exceeds the second rank;
   receiving, from the first available worker, an accept project message;
   assigning, in response to the accept project message and a drag-and-drop operation performed in the single GUI window, the first available worker, wherein the drag-and-drop operation comprises dragging an available worker avatar of the plurality of available worker avatars corresponding to the first worker to the new project avatar;
   receiving, using the time selector displayed in the single GUI window and subsequent to the assigning, a second user selection from the user to select a second future time, wherein the second future time is during a project duration of the new project; and
   modifying, in response to receiving the second user selection of the second future time, the available worker avatar into a occupied worker avatar.

2. The method of claim 1, wherein identifying the plurality of available workers comprises:
   identifying an existing project comprising a completion time within a pre-determined time window before the first future time and comprising a location within a pre-determined distance of the location of the new project; and
   identifying a worker assigned to the existing project, wherein the plurality of available workers includes the worker.

3. The method of claim 2, wherein displaying the plurality of available worker avatars comprises:

displaying another available worker avatar of the plurality of available worker avatars at the location of the existing project on the map, wherein the another available worker avatar corresponds to the worker assigned to the existing project.

4. The method of claim 1, wherein displaying the plurality of available worker avatars comprises:
displaying an available worker panel comprising at least one of the plurality of available worker avatars.

5. The method of claim 1, further comprising:
identifying a plurality of occupied workers unable to work on the new project at the future time;
identifying a plurality of locations corresponding to a plurality of existing projects occupying the plurality of occupied workers at the future time; and
displaying, within the GUI, a plurality of existing project avatars at the plurality of locations on the map and a plurality of occupied worker avatars corresponding to the plurality of occupied workers.

6. The method of claim 5, the method further comprising:
displaying a project status panel identifying a client of an existing project of the plurality of existing projects and a time stamp of the existing project.

7. The method of claim 6, wherein the time stamp comprises at least one selected from a group consisting of a start time of the existing project, an end time of the existing project, a time remaining of the existing project, and a time elapsed of the existing project.

8. The method of claim 5, the method further comprising:
receiving a selection of a worker from a group consisting of the plurality available workers and the plurality of occupied workers; and
displaying, on the map, a post-time path of the worker after the first future time selected by the user.

9. The method of claim 8, the method further comprising:
displaying, on the map, a pre-time path of the worker leading up to the first future time selected by the user.

10. A system for managing a plurality of projects of a small business, comprising:
a processor; and
a graphical user interface (GUI) executing on the processor to display at least a single GUI window comprising:
a time selector configured to identify a first future time and a second future time selected by a user;
a new project panel configured to create a new project at a location and the first future time selected by the user, wherein the second future time is during a project duration of the new project;
an available worker panel configured to identify a plurality of available workers of the small business available to work on the new project at the first future time;
an occupied employee panel configured to identify an occupied worker of the small business during the project duration of the new project; and
a map configured to:
display, in response to creating the new project:
a new project avatar corresponding to the new project at the location; and
an available worker avatar corresponding to a first available worker of the plurality of workers available to work on the new project at the first future time; and
modify, in response to the user selecting the second future time, the available worker avatar into an occupied worker avatar corresponding to the occupied worker,
wherein the first available worker is assigned to the new project as the occupied worker by:
assigning a ranking to a plurality of available workers comprising the first available worker and a second available worker;
sending, before assigning the first available worker, a new project message to the second available worker having a first rank;
receiving a decline project message from the second available worker;
sending, in response to receiving the decline project message, the new project message to the first available worker having a second rank, wherein the first rank exceeds the second rank;
receiving, from the first available worker, an accept project message; and
identifying, in response to the accept project message and a drag-and-drop operation performed in the single GUI window, the first available worker as the occupied worker, wherein the drag-and-drop operation comprises dragging the first available worker avatar to the new project avatar over the map.

11. The system of claim 10, wherein the map further displays a post-time path of the first available worker.

12. The system of claim 10, wherein the map further displays a pre-time path of the first available worker.

13. The system of claim 10, wherein the GUI further comprises:
a project status panel identifying the existing project, a client of the existing project, and a time stamp of the project.

14. A non-transitory computer readable medium storing instructions to manage a plurality of projects of a small business using a graphical user interface (GUI), the instructions comprising functionality to:
receive, at a current time and using a time selector displayed in a single GUI window, a first user selection from a user to select a first future time;
receive, at a current time, a request to schedule a new project at a location and the first future time selected by the user;
identify a plurality of available workers of the small business available to work on the new project at the first future time;
display, within the single GUI window, a new project avatar of the new project at the location on a map and a plurality of available worker avatars corresponding to the plurality of available workers;
assign a ranking to the plurality of available workers comprising a first available worker and a second available worker;
send, before assigning the first available worker, a new project message to the second available worker having a first rank;
receive a decline project message from the second available worker;
send, in response to receiving the decline project message, the new project message to the first available worker having a second rank, wherein the first rank exceeds the second rank;
receive, from the first available worker, an accept project message;
assigning, in response to the accept project message and a drag-and-drop operation performed in the single GUI window, the first available worker to the new project, wherein the drag-and-drop operation comprises dragging an available worker avatar of the plurality of available worker avatars corresponding to the first worker to the new project avatar;

receiving, using the time selector displayed in the single GUI window and subsequent to the assigning, a second user selection from the user to select a second future time, wherein the second future time is during a project duration of the new project; and modifying, in response to receiving the second user selection of the second future time, the available worker avatar into a occupied worker avatar.

15. The non-transitory computer readable medium of claim 14, the instructions further comprising functionality to:

identify an existing project comprising a completion time within a pre-determined time window before the first future time and comprising a location within a pre-determined distance of the location of the new project; and identify a worker assigned to the existing project, wherein the plurality of available workers include the worker.

16. The non-transitory computer readable medium of claim 15, the instructions further comprising functionality to:

display another available worker avatar of the plurality of available worker avatars at the location of the existing project on the map, wherein the another available worker avatar corresponds to the worker assigned to the existing project.

17. The non-transitory computer readable medium of claim 14, the instructions further comprising functionality to:

identify a plurality of occupied workers unable to work on the new project at the first future time;

identify a plurality of locations corresponding to a plurality of existing projects occupying the plurality of occupied workers at the first future time; and display, within the GUI, a plurality of existing project avatars at the plurality of locations on the map and a plurality of occupied worker avatars corresponding to the plurality of occupied workers.

18. The non-transitory computer readable medium of claim 17, the instructions further comprising functionality to:

display a project status panel identifying a client of an existing project of the plurality of existing projects and a time stamp of the existing project.

19. The non-transitory computer readable medium of claim 18, wherein the time stamp comprises at least one selected from a group consisting of a start time of the existing project, an end time of the existing project, a time remaining of the existing project, and a time elapsed of the existing project.

20. The non-transitory computer readable medium of claim 17, the instructions further comprising functionality to:

receive a selection of a worker from a group consisting of the plurality available workers and the plurality of occupied workers; and display, on the map, a post-path of the worker after the future time selected by the user.

21. The non-transitory computer readable medium of claim 20, the instructions further comprising functionality to:

display, on the map, a pre-path of the worker leading up to the future time selected by the user.

* * * * *